(12) United States Patent
Kirrmann et al.

(10) Patent No.: US 10,148,411 B2
(45) Date of Patent: *Dec. 4, 2018

(54) SECURE CLOCK SYNCHRONIZATION

(71) Applicant: ABB Research Ltd, Zurich (CH)

(72) Inventors: Hubert Kirrmann, Dättwil (CH);
Jean-Charles Tournier, Bellegarde sur Valserine (FR)

(73) Assignee: ABB Research Ltd, Zurich (CH)

( * ) Notice: Subject to any disclaimer, the term of this patent is extended or adjusted under 35 U.S.C. 154(b) by 149 days.

This patent is subject to a terminal disclaimer.

(21) Appl. No.: 15/164,541

(22) Filed: May 25, 2016

(65) Prior Publication Data

US 2016/0269167 A1 Sep. 15, 2016

Related U.S. Application Data

(63) Continuation of application No. 13/340,994, filed on Dec. 30, 2011, now Pat. No. 9,363,273.

(30) Foreign Application Priority Data

Jun. 9, 2010 (EP) .................... 10165325

(51) Int. Cl.
*H04L 7/00* (2006.01)
*H04J 3/06* (2006.01)
(Continued)

(52) U.S. Cl.
CPC ............ *H04L 7/0008* (2013.01); *G04G 7/00* (2013.01); *H04J 3/067* (2013.01); *H04L 63/123* (2013.01); *H04J 3/0664* (2013.01); *H04L 9/3242* (2013.01)

(58) Field of Classification Search
None
See application file for complete search history.

(56) References Cited

U.S. PATENT DOCUMENTS

| 5,490,143 A | 2/1996 | Hara et al. |
| 2002/0131484 A1 | 9/2002 | Diepstraten et al. |

(Continued)

FOREIGN PATENT DOCUMENTS

| CN | 101404618 B | 4/2009 |
| DE | 102005025325 A1 | 12/2006 |
| EP | 2148473 A1 | 1/2010 |

OTHER PUBLICATIONS

Notification Concerning transmittal of International Preliminary Report on Patentability (Forms PCT/IB/326 and PCT/IB/373) and the Written Opinion of the International Searching Authority (Form PCT/ISA/237) dated Dec. 20, 2012, issued in corresponding International Application No. PCT/EP2011/057759. (6 pages).

(Continued)

*Primary Examiner* — Huy D Vu
*Assistant Examiner* — Bao G Nguyen
(74) *Attorney, Agent, or Firm* — J. Bruce Schelkopf; Taft Stettinius & Hollister LLP

(57) ABSTRACT

The present disclosure provides a secure one-step IEEE 1588 clock using either a symmetric or asymmetric protection scheme. Clocks of mission-critical or highly-available devices in industrial automation systems connected to a communication network are synchronized by sending, by a master clock, a synchronization message, e.g., a single message of the one-step-clock type according to IEEE 1588, including a time stamp, and by receiving and evaluating, by a slave clock, the synchronization message. A synchronization component or module of the master clock prepares, or composes, prior to a projected send time, a synchronization message including a time stamp of the projected send time, and secures the synchronization message in advance of the projected send time. Securing the synchronization message occurs by suitable cryptographic means allowing for authen- (Continued)

tication of the time stamp at a receiving slave clock. At the projected send time, the secured synchronization message is transmitted.

18 Claims, 2 Drawing Sheets

(51) Int. Cl.
    *H04L 29/06*     (2006.01)
    *G04G 7/00*     (2006.01)
    *H04L 9/32*     (2006.01)

(56) References Cited

U.S. PATENT DOCUMENTS

| | | |
|---|---|---|
| 2003/0117899 A1 | 6/2003 | Eidson |
| 2003/0177154 A1 | 9/2003 | Vrancic |
| 2007/0206644 A1 | 9/2007 | Bertsch et al. |
| 2008/0195860 A1 | 8/2008 | Bedekar et al. |
| 2009/0185501 A1 | 7/2009 | Huang et al. |
| 2009/0204811 A1 | 8/2009 | Fries et al. |
| 2010/0049964 A1 | 2/2010 | Kondapalli et al. |
| 2011/0110359 A1 | 5/2011 | Cooke et al. |
| 2012/0163521 A1* | 6/2012 | Kirrmann ............... H04J 3/067 375/356 |

OTHER PUBLICATIONS

International Search Report (PCT/ISA/210) dated Aug. 17, 2011, by European Patent Office as the International Searching Authority for International Application No. PCT/EP2011/057759.

Written Opinion (PCT/ISA/237) dated Aug. 17, 2011, by European Patent Office as the International Searching Authority for International Application No. PCT/EP2011/057759.

European Search Report dated Nov. 9, 2010 for EP Application No. 10165325.1.

Albert Treytl et al., Practical Application of 1588 Security, Proceedings of 2008 IEEE International Symposium on Precision Clock Synchronization for Measurement, Control and Communication, pp. 37-43.

Jean-Charles Tournier et al., Strategies to Secure the IEEE 1588 Protocol in Digital Substation Automation, Critical Infrastructures, 2009, Fourth International Conference, Mar. 2009, pp. 1-8.

\* cited by examiner

SECURE CLOCK SYNCHRONIZATION

RELATED APPLICATION

This application claims priority as a continuation application under 35 U.S.C. § 120 to Ser. No. 13/340,994, which was filed as a U.S. application on Dec. 30, 2011 which claims priority as a continuation application under 35 U.S.C. § 120 to PCT/EP 2011/057759, which was filed as an International Application on May 13, 2011 designating the U.S., and which claims priority to European Application 10165325.1 filed in Europe on Jun. 9, 2010. The entire contents of these applications are hereby incorporated by reference in their entireties.

FIELD

The present disclosure relates to industrial automation systems or Process Control systems, such as Substation Automation (SA) systems, with an Ethernet based communication network.

BACKGROUND INFORMATION

Process control or industrial automation systems are used extensively to protect, control and monitor industrial processes in industrial plants for manufacturing goods, transforming substances, or generating power, for example, as well as to monitor and control extended primary systems like electric power, water or gas supply systems or telecommunication systems, including their respective substations. An industrial automation system generally has a large number of process controllers which are distributed in an industrial plant or over an extended primary system and communicatively interconnected via a communication system.

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes secondary devices, so-called Intelligent Electronic Devices (IEDs), which are responsible for protection, control and monitoring of the primary devices. The IEDs may be assigned to hierarchical levels, such as the station level, the bay level, and the process level, where the process level is separated from the bay level by a so-called process interface. The station level of the SA system includes an Operator Work Station (OWS) with a Human-Machine Interface (HMI) and a gateway to a Network Control Centre (NCC). IEDs on the bay level, which may also be referred to as bay units, in turn are connected to each other as well as to the IEDs on the station level via an inter-bay or station bus serving the purpose of exchanging commands and status information.

A communication standard for communication between the secondary devices of a substation has been introduced as part of the IEC 61850 standard entitled "Communication Networks and Systems In Substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, IEC 61850-8-1 specifies the Generic Object Oriented Substation Events (GOOSE) directly on the Ethernet link layer of the communication stack. For very fast periodically changing signals at the process level such as measured analog voltages or currents, IEC 61850-9-2 specifies the Sampled Value (SV) service, which, like GOOSE, builds directly on the Ethernet link layer. Hence, the standard defines a format to publish, as multicast messages on an industrial Ethernet, event-based messages and digitized measurement data from current or voltage sensors on the process level.

With the introduction of IEC 61850, precise time synchronization over Ethernet-based networks for secondary devices in process control or substation automation systems has become a concern. As a replacement of the classical Pulse-Per-Second (PPS) signal, IEC 61850 recommends the use of the IEEE 1588 standard to achieve the degree of time synchronization required for critical data such as SV or trip signals. The IEEE 1588 standard can run in two modes. In a one-step-clock mode, a master clock sends a synchronization message and at the same time timestamps the message and inserts the timestamp in the content of the same message. In a two-step-clock mode, the timestamp is not carried directly in the synchronization message but in a follow-up message.

A further prominent aspect in substation automation is the increased importance placed on cyber-security. While the protocols defined by IEC 61850, such as 8-1 and 9-2, are covered by IEC 62351-6 to define the required security mechanisms, IEEE 1588 remains unprotected. One of the problems in securing IEEE 1588 is the inability to secure the protocol when using a one-step-clock approach. A two-step-clock is trivial to secure, whether with a symmetric or asymmetric scheme, since the synchronization message is a non-sensitive message that is never modified at all. On the other hand, a secured one-step clock approach requires securing the synchronization message on the fly (while being forwarded), and thus is almost impossible (for an asymmetric scheme) or impossible (for a symmetric scheme or for a 1 Gbit/sec network) to implement.

EP 2148473 relates to mission-critical or highly-available applications based on a ring-type communication network with a plurality of switching nodes and operating with full duplex links. A sender node that is connected over a respective first and second port to the communication network transmits pairs of redundant frames. For each frame to be sent on the ring network, a source and a duplicate frame are transmitted in opposite directions, where both frames are relayed by the other nodes of the ring network until they eventually return back to the originating sender node. As a consequence, network load is roughly doubled with respect to a conventional ring network, but the destination node will receive the data after a maximum transmission delay that equals the longest possible path of the ring. In the fault-free state, the destination node thus receives two redundant frames with the same contents. The redundant frames can be identified according to a Parallel Redundancy Protocol (PRP). Therefore, only the earlier or first frame of the two frames is forwarded to the upper layer protocols and the later or second frame is discarded. As the synchronization message and the follow-up message of a two-step-clock approach may take different paths or directions in HSR, use of a one-step-clock is preferred.

The paper "Practical Application of 1588 Security", by Albert Treytl, Bernd Hirschler, IEEE International Symposium on Precise Clock Synchronization, September 2008, Ann Harbor, USA, proposes a way to Implement a secure one-step-clock in which a static part of the synchronization message is hashed upfront. The timestamp is then produced and embedded in the message, following which the hash is completed rapidly on the remaining part of the message, i.e., the timestamp. The drawback of this approach is that it only allows a symmetric protection scheme which is less time consuming than the asymmetric one. Indeed, the operation is still done on the fly, i.e., hashing of the remaining part as well as signing, and is therefore time critical. Another drawback is the limitation of this approach to a 100 Mbit/sec network, since for a 1 Gbit/sec network the remaining hashing operations will not be completed on time.

SUMMARY

An exemplary embodiment of the present disclosure provides a method of synchronizing clocks connected to a communication network. The exemplary method includes sending, by a master clock, a synchronization message including a time stamp, and receiving the synchronization message by a slave clock. The sending of the synchronization message includes preparing, prior to a projected send time $t_{send}$, a synchronization message including a time stamp of the projected send time $t_{send}$, securing the synchronization message, and sending, at the projected send time $t_{send}$, the secured synchronization message.

An exemplary embodiment of the present disclosure provides a master clock device for synchronizing slave clocks connected to a communication network. The master clock device is configured to prepare and send synchronization messages including a time stamp. The master clock device includes a synchronization component configured for preparing a synchronization message including a time stamp of a projected send time $t_{send}$ and for securing the synchronization message. The master clock device also includes a wait component configured for temporarily storing the secured synchronization message until the projected send time $t_{send}$.

An exemplary embodiment of the present disclosure provides a non-transitory computer-readable recording medium having a program recorded thereon that causes a processor of a master clock device to execute operations of synchronizing clocks connected to a communication network. The program causes the processor to execute operations including sending, by the master clock device, a synchronization message including a time stamp to be received by a slave clock. The sending of the synchronization message includes preparing, prior to a projected send time $t_{send}$, a synchronization message including a time stamp of the projected send time $t_{send}$, securing the synchronization message, and sending, at the projected send time $t_{send}$, the secured synchronization message.

BRIEF DESCRIPTION OF THE DRAWINGS

Additional Refinements, Advantages and Features of the Present Disclosure are Described in More Detail Below with Reference to Exemplary Embodiments Illustrated in the Drawings, in which.

DETAILED DESCRIPTION

Figure 1:
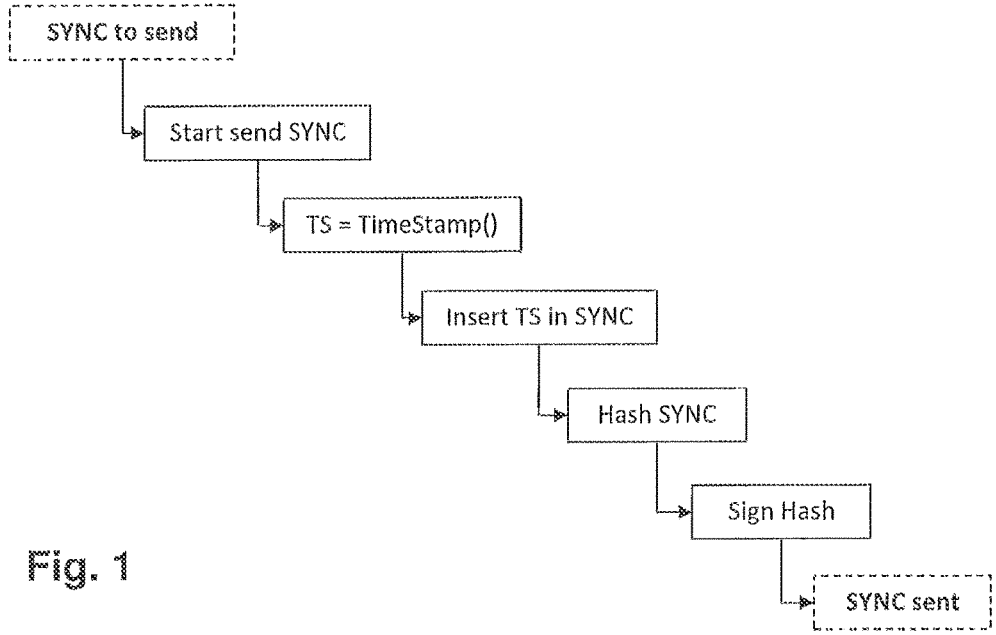
FIG. 1 depicts a sequence of operations for a secure one-step-clock implementation outside the scope of the present disclosure.

Exemplary embodiments of the present disclosure secure a one-step IEEE 1588 clock using either a symmetric or asymmetric protection scheme. For instance, exemplary embodiments of the present disclosure provide a method of synchronizing clocks connected to a communication network, and a master clock device for synchronizing slave clocks connected to a communication network, where the master clock device is configured to prepare and send synchronization messages including a time stamp.

According to an exemplary embodiment of the present disclosure, clocks of mission-critical or highly-available devices in industrial automation systems connected to a communication network are synchronized by sending, by a master clock, a synchronization message, for example, a single message of the one-step-clock type according to IEEE 1588, including a time stamp, and by receiving and evaluating, by a slave clock, the synchronization message. A synchronization component or module of the master clock prepares, or composes, prior to a projected send time $t_{send}$, a synchronization message including a time stamp of the projected send time, and secures the synchronization message still in advance of the projected send time. Securing the synchronization message takes place by suitable cryptographic means allowing at least for authentication of the time stamp at a receiving slave clock, for example, by calculating and signing a checksum or hash of the synchronization message. At the projected send time, the secured synchronization message is transmitted.

In accordance with an exemplary embodiment of the present disclosure, the secured synchronization message is stored in a dedicated wait component of a transmitter of the master clock device prior to being sent at $t_{send}$.

In accordance with an exemplary embodiment of the present disclosure, a Low Priority Queue (LPQ) of the transmitter is blocked and sending of non-synchronization messages from the LPQ is disabled during a blocking interval prior to $t_{send}$. A conservative blocking interval corresponding to the longest message expected in the LPQ ensures that no message is in the process of being transmitted at $t_{send}$. In accordance with an exemplary embodiment, the length of a message from the LPQ is checked prior to sending in order to ascertain completion of its transmission prior to $t_{send}$. Hence, the synchronization messages will always be transmitted without further delay or jitter due to ongoing transmission of low priority messages.

In accordance with an exemplary embodiment, the clock devices are arranged as switching nodes in a ring-type communication network operating with full duplex links, wherein a sender node that is connected over a respective first and second port to the communication network transmits pairs of redundant frames. For each synchronization message to be sent on the ring network, a source and a duplicate synchronization message are transmitted in opposite directions, where both messages are relayed by the other nodes of the ring network until they eventually return back to the originating sender node. Such redundant communication network topology is advantageously employed in industrial automation systems or Process Control systems, for example, in SA systems for substations in high and medium-voltage electric power networks.

FIG. 1 depicts an exemplary but rather impractical sequence of operations required for a straight-forward Implementation of a secure one-step IEEE 1588 clock. The main problem associated therewith is the inability to compute all the required operations on the fly. In particular, such a clock would have to start sending the first byte of the synchronization message SYNC, then time stamp the sending operation, insert the time stamp in the message, and finally hash and sign the message with the shortest possible time delay.

Figure 2:
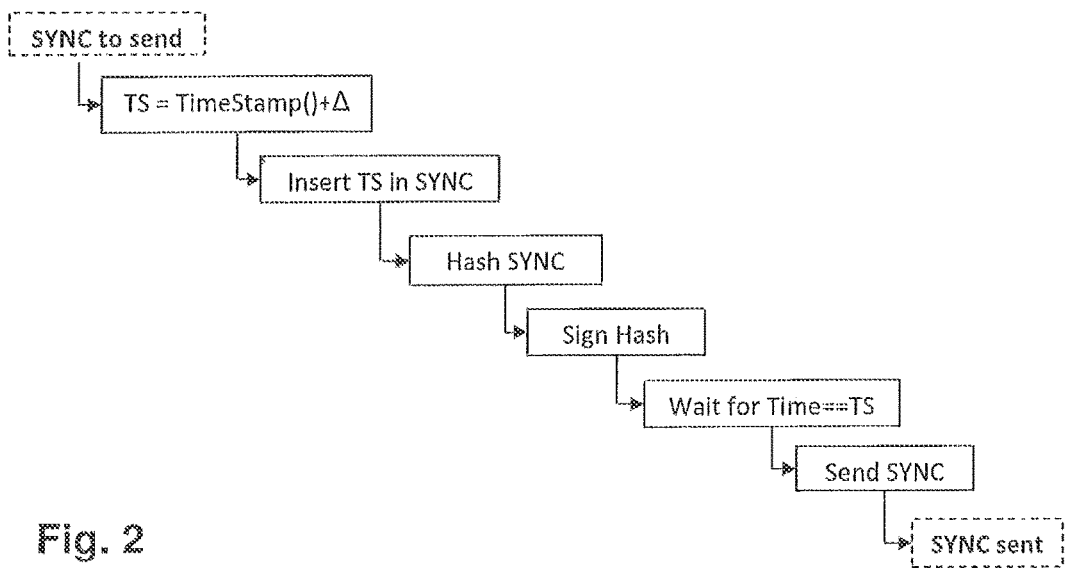
FIG. 2 depicts a modified sequence of operations for a secure one-step-clock according to an exemplary embodiment of the present disclosure.

FIG. 2 depicts an exemplary sequence of operations of a secure IEEE 1588 one-step clock preparing synchronization messages in advance, according to an exemplary embodiment of the present disclosure. According to an exemplary embodiment of the present disclosure, the synchronization message SYNC is prepared for a future time stamp. For example, the present disclosure provides a technique of producing and embedding the time stamp for a future time $t_{send} = t_{prep} + \Delta t$, where the time $t_{prep}$ designates the time at which the preparation of the synchronization message starts and its advanced time stamp is determined. By carefully choosing the preparation interval or advance delay $\Delta t$, a sufficient time to perform all necessary operations prior to sending the secured synchronization at the projected send time $t_{send}$ is available.

Figure 3:
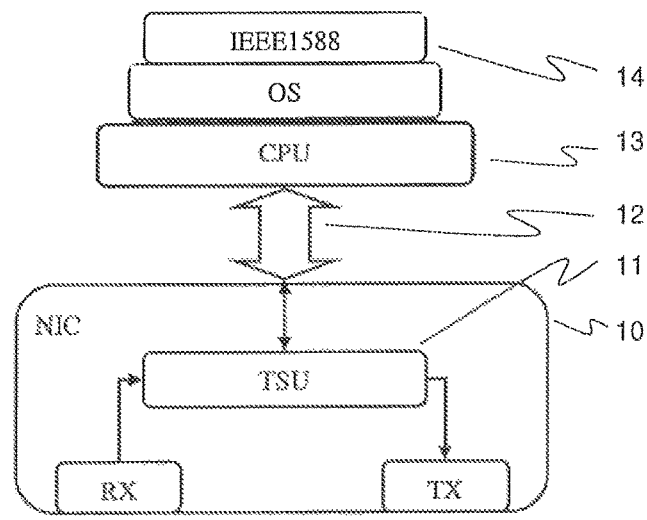
FIG. 3 and FIG. 4 depict corresponding system architectures according to an exemplary embodiment of the present disclosure.

FIG. 3 shows the corresponding system architecture of a one-step clock implementation. It is the ultimate responsibility of the IEEE 1588 low-level stack to ensure that the synchronization message is sent on time, and the proposed improvement is implemented in hardware to achieve required timing precision. The hardware level, or low-level stack, includes a dedicated Integrated Circuit (IC) chip or Field Programmable Gate Array (FPGA), for example, as part of the Network Interface Card (NIC) 10 of the device, and executes all time-critical aspects of the synchronization procedure, such as time stamping IEEE 1588 SYNC messages when they are received and sent. The logical gates of the Time Stamping Unit (TSU) 11 are coded by way of a low programming language such as VHDL. On a higher abstraction level, all non-time critical aspects are implemented within the regular IEEE 1588 stack 14, either on the same dedicated chip or on the CPU 13 of the device, the latter being connected to the TSU via exemplary communication bus (e.g., PCI) 12. In this case, the IEEE 1588 stack runs on the CPU as a software implementation, while only the time stamp operation is achieved at the hardware level. In accordance with an exemplary embodiment of the present disclosure, no modifications are implied on the software stack but only on the logic implementing the sequence of steps according to FIG. 2, for example, when sending a synchronization message.

Figure 4:
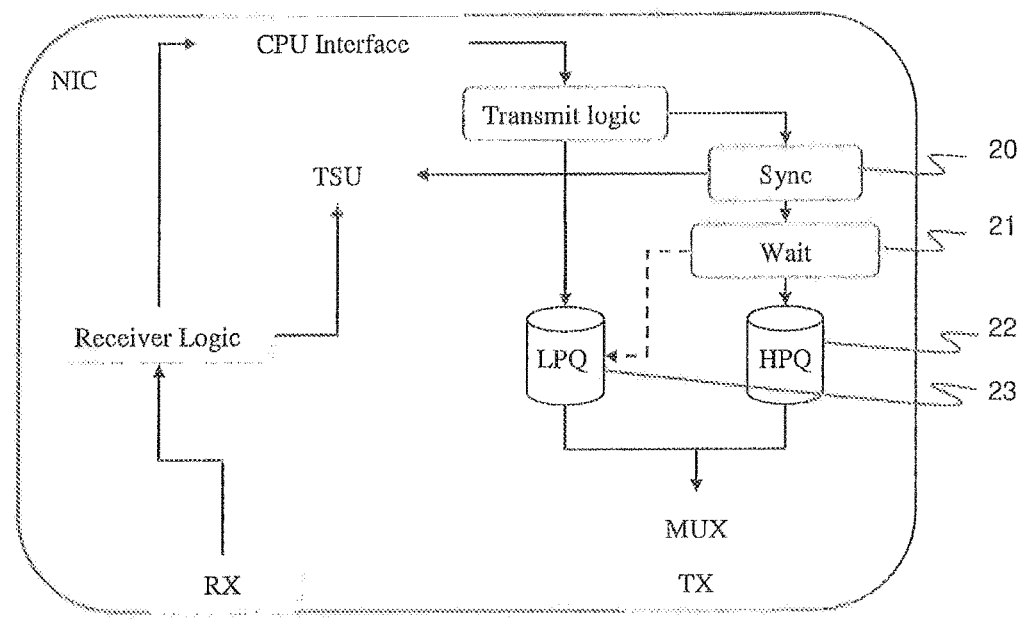

FIG. 4 depicts the detailed architecture of a low level stack supporting the secure IEEE 1588 one-step-clock formed in advance. The various components should be understood from an architecture point of view (e.g., in terms of software engineering) as entities performing a function and having inputs and outputs. As mentioned above, from an implementation point of view, a component can implemented as a VHDL component (i.e., dedicated gates with some non-transitory memory (e.g., a computer-readable recording medium, such as a non-volatile memory) if implemented in FPGA, but also a C function or Java object if implemented in software.

The receiver logic illustrated in FIG. 4 remains unmodified compared to a normal implementation of IEEE 1588 with hardware support. Its purpose is to decode the messages received from the network, and to detect the arrival of a synchronization message requesting a time stamping operation to be performed by the TSU. Similarly, the transmit logic detects the presence of an outbound synchronization message, originating, for example, from the CPU of the device, and likewise requesting a time stamping operation.

The sequence of operations represented in FIG. 2 is implemented in the components Sync 20 and Wait 21. The former is responsible for preparing, including receiving the timestamp from the TSU, the fully secured synchronization message, while the latter withholds sending the message until the projected send time $t_{send}$. The transmission port TX contains two queues, a High Priority Queue (HPQ) 21 dedicated to IEEE 1588 secure synchronization messages and a Low Priority Queue (LPQ) 22 for any non-sync messages. The HPQ 21 has the highest priority, meaning that whenever a message is placed in the queue, the message will be transmitted without further delay. Nevertheless, in case the transmitter has just started sending a message from the LPQ 22, the sending of the synchronization message is delayed by [(sizeof(max_length_ethernet_packet)+interframe_gap)/network_speed]. This leads to a maximum delay of (1526×8+12×8)/(100 Mbits/sec)=12.6 psec for a 802.3 MAC frame on a 100 Mbit/sec network. To prevent this additional uncontrolled jitter, the Wait component 21 has to block or disable the sending of any frame from the LPQ in a blocking interval $\Delta_{block}$ of 12 □s prior to $t_{send}$.

The choice of the preparation interval $\Delta t$ depends on many parameters such as the hardware used, the security scheme, the speed of the network, etc. For example, the VHDL implementation of a specific hash function known as AES (Advanced Encryption Standard) requires between 50 (high performance) and 106 (low performance) cycles of 20 ns (50 MHz) for hashing 6 bytes, resulting in a delay of about 33 psec or 70 psec for a 200 bytes long synchronization frame, for example. In this case, $\Delta t$ must be at least 33 psec or 70 psec plus the required delay to insert the time stamp in the synchronization message.

The exemplary configurations of FIGS. 3 and 4 were described functionally. It is to be understood that the functional features of these configurations can be implemented by processing circuitry (e.g., a FPGA, application specific processor or general-purpose processor) of a CPU executing computer-readable instructions (e.g., a software program) tangibly recorded on a non-transitory computer-readable recording medium, such as a hard disk drive, ROM, optical memory, flash memory or any other type of non-volatile memory.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of synchronizing clocks connected to a communication network, comprising:
sending, by a first clock, a synchronization message including a time stamp; and
receiving the synchronization message by a second clock;
wherein the sending of the synchronization message comprises:
preparing, prior to a projected send time $t_{send}$, a synchronization message including a time stamp of the projected send time $t_{send}$;
securing the synchronization message;
starting preparation of the secured synchronization message at a time $t_{prep}$ preceding the projected send time $t_{send}$ by $\Delta t$, wherein $\Delta t$ is a preparation delay based on a processing capacity of processing hardware generating the synchronization message; and sending, at the projected send time $t_{send}$, the secured synchronization message;

wherein the sending of the synchronization message comprises:

designating, by the first clock, the projected send time $t_{send}$ for sending the synchronization message by determining the preparation delay time $\Delta t$ from a present time based on current conditions of the communication network, the processing capacity of the processing hardware generating the synchronization message, and a security scheme utilized to secure the synchronization message.

2. The method according to claim 1, comprising:

storing, in a wait component, the secured synchronization message prior to sending at the projected send time $t_{send}$.

3. The method according to claim 1, comprising:

disabling, for a blocking interval $\Delta_{block}$ prior to the projected send time $t_{send}$, sending of non-synchronization messages with a length exceeding a length of the blocking interval $\Delta_{block}$.

4. The method according to claim 1, wherein:

the communication network has a ring topology;

the first clock comprises a first clock device with a first communication port and a second communication port respectively connected to a first neighboring node and a second neighboring node of the communication network; and the method comprises, by the first clock device:

generating a duplicate synchronization message of the secured synchronization message; and transmitting, essentially simultaneously via the first port and the second port, respectively, the synchronization message and the duplicate synchronization message to the first neighboring node and the second neighboring node.

5. The method according claim 4, wherein the second clock is comprised in an Intelligent Electronic Devices (IED) of a Process Control or Substation Automation (SA) system.

6. A first clock device for synchronizing second clocks connected to a communication network, the device being configured to prepare and send synchronization messages including a time stamp, wherein the device comprises:

a synchronization component configured for preparing a synchronization message including a time stamp of a projected send time $t_{send}$ and for securing the synchronization message; and a wait component configured for temporarily storing the secured synchronization message until the projected send time $t_{send}$;

wherein the synchronization component is configured to start preparation of the secured synchronization message at a time $t_{prep}$ preceding the projected send time $t_{send}$ by $\Delta t$;

wherein $\Delta t$ is a preparation delay based on a processing capacity of processing hardware generating the synchronization message; and wherein the synchronization component is configured to designate the projected send time $t_{send}$ for sending the synchronization message by determining the preparation delay time $\Delta t$ from a present time based on current conditions of the communication network, the processing capacity of the processing hardware generating the synchronization message, and a security scheme utilized to secure the synchronization message.

7. The first clock device according to claim 6, comprising:

a transmission port TX with a Low Priority Queue LPQ, wherein during a blocking interval $\Delta_{block}$ prior to the projected send time $t_{send}$, sending of non-synchronization messages from the LPQ with a length exceeding the length of the blocking interval $\Delta_{block}$ is disabled.

8. The method according to claim 2, wherein:

the communication network has a ring topology;

the first clock comprises a first clock device with a first communication port and a second communication port respectively connected to a first neighboring node and a second neighboring node of the communication network; and the method comprises, by the first clock device:

generating a duplicate synchronization message of the secured synchronization message; and transmitting, essentially simultaneously via the first port and the second port, respectively, the synchronization message and the duplicate synchronization message to the first neighboring node and the second neighboring node.

9. The method according claim 8, wherein the second clock is comprised in an Intelligent Electronic Devices (IED) of a Process Control or Substation Automation (SA) system.

10. The method according to claim 3, wherein:

the communication network has a ring topology;

the first clock comprises a first clock device with a first communication port and a second communication port respectively connected to a first neighboring node and a second neighboring node of the communication network; and the method comprises, by the first clock device:

generating a duplicate synchronization message of the secured synchronization message; and transmitting, essentially simultaneously via the first port and the second port, respectively, the synchronization message and the duplicate synchronization message to the first neighboring node and the second neighboring node.

11. The method according claim 10, wherein the second clock is comprised in an Intelligent Electronic Devices (IED) of a Process Control or Substation Automation (SA) system.

12. A non-transitory computer-readable recording medium having a program recorded thereon that causes a processor of a first clock device to execute operations of synchronizing clocks connected to a communication network, the operations comprising:

sending a synchronization message including a time stamp to be received by a second clock, wherein the sending of the synchronization message comprises:

preparing, prior to a projected send time $t_{send}$, a synchronization message including a time stamp of the projected send time $t_{send}$;

securing the synchronization message;

starting preparation of the secured synchronization message at a time $t_{prep}$ preceding the projected send time $t_{send}$ by $\Delta t$, wherein $\Delta t$ is a preparation delay based on a processing capacity of processing hardware generating the synchronization message;

designating, by the first clock, the projected send time $t_{send}$ for sending the synchronization message by determining the preparation delay time $\Delta t$ from a present time based on current conditions of the communication network, the processing capacity of the processing hardware generating the synchronization message, and a security scheme utilized to secure the synchronization message; and sending, at the projected send time $t_{send}$, the secured synchronization message.

13. The non-transitory computer-readable recording medium according to claim 12, wherein the program causes the processor to execute operations comprising:

storing, in a wait component, the secured synchronization message prior to sending at the projected send time $t_{send}$.

14. The non-transitory computer-readable recording medium according to claim 12, wherein the program causes the processor to execute operations comprising:

disabling, for a blocking interval $\Delta_{block}$ prior to the projected send time $t_{send}$, sending of non-synchronization messages with a length exceeding a length of the blocking interval $\Delta_{block}$.

15. The non-transitory computer-readable recording medium according to claim 12, wherein:

the communication network has a ring topology;

the first clock comprises a first clock device with a first communication port and a second communication port respectively connected to a first neighboring node and a second neighboring node of the communication network; and the program causes the processor to execute operations comprising:

generating a duplicate synchronization message of the secured synchronization message; and transmitting, essentially simultaneously via the first port and the second port, respectively, the synchronization message and the duplicate synchronization message to the first neighboring node and the second neighboring node.

16. The non-transitory computer-readable recording medium according claim 15, wherein the second clock is comprised in an Intelligent Electronic Devices (IED) of a Process Control or Substation Automation (SA) system.

17. The method according to claim 1, wherein the first clock is a master clock.

18. The method according to claim 1, wherein the second clock is a slave clock.

* * * * *